United States Patent [19]
Chahine

[11] Patent Number: 5,500,134
[45] Date of Patent: Mar. 19, 1996

[54] MICROFILTRATION SYSTEM WITH SWIRLING FLOW AROUND FILTER MEDIUM

[75] Inventor: Georges L. Chahine, Montgomery, Md.

[73] Assignee: Dyna Flow, Inc., Fulton, Md.

[21] Appl. No.: 405,512

[22] Filed: Mar. 16, 1995

[51] Int. Cl.$^6$ .......................... B01D 21/26; B01D 27/00
[52] U.S. Cl. .................. 210/787; 210/777; 210/803; 210/315; 210/436
[58] Field of Search ............................ 210/232, 234, 210/304, 323.2, 314, 315, 338, 414, 422, 424, 451, 452, 453, 456, 512.1, 778, 787, 788, 803, 497.05, 436, 777, 807, 808

[56] References Cited

U.S. PATENT DOCUMENTS

| | | | |
|---|---|---|---|
| 4,253,959 | 3/1981 | Tafara | 210/452 |
| 4,293,414 | 10/1981 | Gienneli | 210/436 |
| 4,313,830 | 2/1982 | Tulin et al. | 210/778 |
| 4,379,053 | 4/1983 | Bane | 210/424 |
| 4,597,871 | 7/1986 | Okouchi et al. | 210/456 |
| 4,994,887 | 7/1990 | Frederick | 210/778 |
| 5,273,665 | 12/1993 | White | 210/414 |

*Primary Examiner*—Robert A. Dawson
*Assistant Examiner*—David A. Reifsnyder
*Attorney, Agent, or Firm*—Christopher N. Sears

[57] ABSTRACT

A method and apparatus for separating particles from liquids is disclosed. The apparatus comprises a generally cylindrical swirl chamber with a generally axially symmetric shape, and a porous filter element positioned coaxially inside the swirl chamber. The porous filter is preferably composed of a plurality of porous tubes. The liquid to be treated is forced into the swirl chamber through tangential injection slits extending along most of the height of the chamber, which generate a vortex flow inside the swirl chamber and around the porous filter element. Particle-free liquid permeates across the porous filter, flows along its interior, and is collected at a filtrate outlet port. The remaining liquid, now having a higher particle concentration, flows out of the apparatus and can be separately collected, or recirculated back to the apparatus for further separation. The swirling flow retards particle motion toward the filter element thus minimizing buildup of a cake of particles on the porous filter medium. The swirling flow also enables increased shear along the filter medium, reducing cake formation. In addition, the swirl produces a favorable stratification in the cake that tends to reduce the cohesion of the cake. The slits are designed to enforce similar flow conditions in all sections of the swirl chamber, thereby preventing uneven loading of the filter element and particle accumulation at the bottom of the chamber. The flow is periodically interrupted, causing the cake to be partially removed. These mechanisms enable attainment of much higher flow rates of effluent liquid than conventional cross flow filtration systems.

12 Claims, 3 Drawing Sheets

MICROFILTRATION SYSTEM WITH SWIRLING FLOW AROUND FILTER MEDIUM

FIELD OF THE INVENTION

The present invention relates to filtration of particles from liquids, and more specifically to an efficient means of cross-flow filtration with porous filters.

BACKGROUND OF THE INVENTION

Filtration methods of treatment of wastewaters are presently performed by a number of different methods, which include chemical methods and mechanical methods. Mechanical methods of filtration typically operate by physical exclusion; the wastewater is passed through a porous medium, which blocks particles larger than the size of the pores but allows the transit of water and particles smaller than the pores (the filtrate). Decreasing the size of the pores improves the quality of the filtrate permeating through the porous medium, but typically requires more powerful pumps and higher energy expenditures to counter the pressure drop created by the smaller pore size. Mechanical methods of filtration fall into two general categories: cross-flow and through-flow filtration. In through-flow filtration, both wastewater flow and filtrate flow are normal to the surface of the filter medium; thus the filtered particles continuously accumulate on and within it. The filtrate flux steadily decreases with time when the pressure drop across the filter is maintained constant, and frequent "back-washing" is necessary to remove the accumulated solids from the filter matrix.

In cross-flow filtration, the wastewater flow is mostly parallel to the filter surface, with the filtrate permeation occurring perpendicular to the flow. A quasi-steady operation is possible, because the continuous build-up of the separated solids on the filter surface is largely prevented by the hydrodynamic shear exerted by the cross-flow. Consequently, a major advantage of cross-flow filtration over through-flow filtration is its high filtration rate.

Cross-flow filtration technology can be separated into two different branches, microfiltration and ultrafiltration. Microfiltration removes primarily suspended solids, and requires relatively low filtration pressures (around 15 psi); it can use relatively rugged thick-walled porous tubes, such as the HYDROPERM™ microfiltration tubes manufactured by DYNAFLOW, INC. of Fulton, Md., whose pore structure and distribution in the thermoplastic polymer material can be controlled during the manufacturing process. Ultrafiltration, on the other hand, intends to remove substances at the molecular level in addition to suspended solids, requires higher pressures (around 50 psi), and employs relatively fragile thin membranes. The present invention is more specifically targeted at the microfiltration field, and is well suited for the optimal use of HYDROPERM™ microfiltration tubes. Systems applying the teachings of the present invention in combination with these microfiltration tubes are called DYNAPERM™ systems.

Swirling the flow in a chamber containing the porous filter element coaxially at the center of the generated vortex presents advantages in the filtering of water containing particles in suspension. Among these advantages is the fact that the particles are being moved to the periphery of the chamber in which the vortex takes place, whereas the filter element is located at the center of the chamber. Therefore, the particles are prevented from clogging the surface of the porous filter element and from increasing the pressure drop across the filter. Another advantage is the fact that an effective cross-flow filtration regime is achieved, in which the shear of the liquid flow along the surface of the filter element prevents the excessive build up of the layer of particles on this filter element, thereby maintaining the pressure drop to an acceptable level. In the prior art these advantages have not been exploited to their full potential. Indeed in the prior art the geometries of the components generating the swirl are not inductive to producing flow conditions that are similar and optimal along the whole length of the filter element. For example, U.S. Pat. No. 4,597,871 to Okouchi discloses a cyclone configuration for the removal of small marine organisms from seawater to be used as a cooling liquid for power plants. The inlet is a single pipe located at the top of the chamber, and the filter element extends much below the inlet. The parts of the filter element close to the inlet will be subjected to much stronger vortex action than the parts away from the inlet. This inhomogeneous flow configuration may also lead to regions of idle liquid where the particles in suspension are allowed to drop by gravity and accumulate at the bottom of the chamber. The present invention is distinct from the teachings of Okouchi. In the present invention the swirling action is generated by long narrow slits that extend mostly all the way along the falter element, with the goals that regions of idle fluid are avoided and that along its whole length the filter element is subjected to similar and optimal vortex flow conditions. Okouchi does not teach this type of configuration.

SUMMARY OF THE INVENTION

The present invention fulfills the need for a compact and efficient system for the treatment of wastewaters allowing both high throughput and high filtration efficacy. This need is growing as federal and state regulations for wastewater treatment are becoming more stringently enforced.

As embodied herein, the invention provides a filtration module that comprises two concentric chambers, an outer chamber and a swirl chamber. The swirl chamber is generally cylindrical. The filtration module also comprises a filter element placed centrally along the axis of the swirl chamber. In a preferred embodiment of the invention, the filter element is composed of a plurality of thin porous microfiltration tubes, such as the HYDROPERM™ microfiltration tubes manufactured by DYNAFLOW, INC. of Fulton, Md. The two concentric chambers communicate with each other through several slits. These slits are three dimensional conduits through the lateral wall of the swirl chamber, with a cross-section and a longitudinal dimension. The cross-section of each of these slits is very narrow and very long, with its larger dimension being parallel to the axis of the swirl chamber and extending along most of the height of the swirl chamber. The longitudinal dimension of these conduits extends in a direction that is almost tangential with respect to the contours of the inner sections of the swirl chamber. This longitudinal dimension is intended to induce a swirling tangential flow within the swirl chamber. Sufficient length is required for this longitudinal dimension to produce a swirling tangential flow. In one embodiment of the invention, this length is obtained by using a thick lateral wall for the swirl chamber, and by machining the slits as rectangular conduits through this thick wall. In another embodiment of the invention, the lateral wall of the swirl chamber is composed of several lapped curved sheets, and the slits are created by the spacings between these lapped curved sheets. In yet another embodiment, these lapped curved elements can take the form of lapped curved foils with a wing-like section having a rounded leading edge and a thin trailing edge.

The outer chamber comprises at least one inlet port, and the swirl chamber comprises at least two outlet ports, a filtrate outlet port and a bypass outlet port. Particle laden liquid enters the outer chamber through the inlet port, is forced into the swirl chamber through the tangential slits allowing a passage between the outer and swirl chambers, and is set in vortex rotation by these slits. At the core of the vortex, liquid reaches the walls of the porous tubes of the filter element, permeates through these walls and is thereby filtrated and cleaned before it exits through the filtrate outlet port, where it can be collected. The rest of the liquid, now having a higher particle concentration, exits the swirl chamber through the bypass outlet, to be collected or recirculated to the inlet port of the outer chamber.

As already mentioned, the slits extend along most of the axial dimension of the swirl chamber so as to generate inside the swirl chamber a swirling flow that has similar and homogeneous swirling characteristics at various cross-sections of the swirl chamber perpendicular to the chamber axis. Consequently, each section of the filter element receives similar flow velocities, which can be adjusted by an appropriate selection of the dimensions of the slits to correspond to locally optimal filtration conditions and to increased filtration rates. Accordingly, every part of the surface of the filter medium is used in more ideal conditions. This results in a system that makes a better use of its filter medium than systems that do not follow the teachings of the present invention. By contrast, injecting flow to the swirl chamber through a single horizontal tangential pipe, as seen in the prior art, would result in a flow field that is very dissimilar according to the cross-section of the chamber and cannot be optimally set for every part of the filter element. Also, such flow field would generate regions of idle flow influenced by forces of gravity in which the particles are allowed to drop to the bottom, an undesirable effect in the treatment of wastewater.

According to the invention, the combination in a generally cylindrical filtration chamber of elongated tangential wall slits parallel to the axis of the chamber with a filter element along the axis of the chamber produces a flow field that is ideally suited for an optimal microfiltration process in the filter element along the whole length of the filter element. Indeed this flow field is composed of two regions:

an outer region extending from the chamber wall to a radius $\alpha$, in which centrifugal forces are preponderant with respect to viscous forces. In this region, the particles are pushed away from the filter medium, therefore minimizing the particle concentration near the filter medium and preventing filter clogging.

an inner region of radius $\alpha$ acting as a boundary layer for the core filter medium in which viscous forces and shear play a more important role. Because of the pressure gradient distribution in this region, larger particles are subjected to larger centripetal forces than smaller particles. Consequently, larger particles tend to reach the surface of the filter medium first, resulting in a well-segregated stratification of particles in the cake at the surface of the medium, with larger particles closer to the medium. This segregation mode is known to provide the best filtration performance at the lowest pressure drop. An additional advantage of this segregation mode is that the presence of larger particles at the interface between the filter medium and the cake produces reduced contact forces for the cake, so that the cake can readily fall off when the liquid flow is interrupted. Finally, the shear in this inner region of the flow keeps this cake thin, also contributing to keeping the pressure drop across the cake at a low and constant level.

In summary, according to the invention, the tangential slits are designed so as to provide the following advantages that result in increased filtration rates:

The motion of particles toward the filter element at the center of the inner chamber is delayed because of centrifugal forces, so that the fluid reaching the filter is cleaner than the fluid entering the inner chamber and clogging of the filter surface is reduced.

The hydrodynamic shear at the filter surface is increased, thereby preventing the settling of a thick clogging cake on the filter surface.

The particles reaching the filter medium tend to stratify from large particles close to the medium to thin particles, thereby producing a cake with reduced pressure drop and increased filtering ability.

The contact forces between the cake and the filter medium are reduced by the presence of large particles along the interface, whereby the cake readily falls off when the flow is interrupted.

The swirling motion around the filter element generated by the tangential slits is similar for all sections of the swirl chamber, thereby evenly generating the previous four beneficial effects in all sections of the chamber.

According to the invention, valves are mounted on the bypass outlet port and on the filtrate outlet port. By adjusting the settings of these valves, the user can adjust the pressure drops at the outlet ports, thereby controlling the proportion of liquid exiting through the bypass outlet relative to liquid exiting through the filtrate outlet. This enables the control of the tangential velocity of the flow along the filter element (angular and axial velocity) in comparison to the velocity of the flow penetrating the filter element.

In particular, before the buildup of a cake of particles on the filter medium at the beginning of the filtering operation, the pressure drop across the filter medium is low; if no additional pressure drop was created on the filtrate flow, for a very short time a large proportion of the flow would go right through the filter instead of being recirculated; as a result, the ratio of tangential velocity over normal velocity at the filter surface would be low, and the advantages of a swirling action as enumerated above would be lost, namely the hydrodynamic shear would be low and a thick cake would rapidly settle on the filter medium, obstructing all further flow through the filter medium. Therefore, to maintain an optimal shear level from the beginning to the end of the filtering operations, it is necessary to maintain an optimal total pressure drop in the filtrate flow, by closing the filtrate outlet valve more while the pressure drop across the filter medium is low, and by progressively opening the valve more as the pressure drop across the filter medium increases.

Furthermore, in one embodiment of a method according to the invention, the flow of wastewater is periodically interrupted. As a consequence, the hydrodynamic forces that maintain the cake of collected particles against the surface of the filter disappear; the cohesion forces along the filter medium surface are weak because of the presence of large particles along the interface, as described above; therefore a flow interruption allows the cake to fall off. In one embodiment of an apparatus according to the invention, a purging outlet is provided at the bottom of the swirl chamber. This purging outlet can be opened while the flow of wastewater is interrupted, in order to purge out of the circuit the concentrated wastewater containing the particles originated from the cake that have accumulated by gravity at the bottom of the chamber. The flow of wastewater can then be restarted without the pressure drops resulting from a built-up cake.

Finally, according to the invention, the filtrate outlet valve is used at the end of an operation to completely close the filtrate outlet and prevent water from draining out of the swirl chamber, thereby preventing the filter medium from drying between operations; indeed, filter medium made of polymer may shrink when it dries and the resulting stress may damage the material.

With an apparatus and method according to the invention, a factor of twenty in production increase of effluent compared to a device without tangential slits has been observed in experiments.

OBJECTS AND ADVANTAGES OF THE INVENTION

Accordingly, several objects and advantages of the invention are:

To provide an apparatus for separating particles from a liquid wherein the liquid is swirled by long narrow slits in a swirl chamber, and wherein the liquid then reaches the surface of a filter element located along the axis of the swirl chamber with a tangential component in order to achieve cross-flow filtration through the surface of this filter element.

To provide a liquid filtration apparatus wherein the long narrow slits create a flow velocity distribution and a flow pressure distribution such that most particles are kept away from the surface of the filter medium and such that among the particles that reach the surface of the filter medium the larger particles reach the surface first, resulting in a stratified particle cake in which the contact forces between the cake and the surface of the filter medium are weak To provide a liquid filtration apparatus wherein the long narrow slits extend along most of the height of the lateral wall of the swirl chamber so that the flow characteristics are independent of the cross-section of the swirl chamber, and so that the filter surface receives optimal flow conditions along most of the length of the filter element.

To provide an apparatus for separating particles from a liquid comprising at least two outlets, a filtrate outlet for the fluid that was able to pass through the filter medium, and a bypass outlet for fluid that does not pass through the filter medium, wherein a proportion of the liquid comes out of the bypass outlet, whereby the ratio of tangential velocity along the surface of the filter medium over the velocity of fluid traversing the filter medium is not negligible, and whereby the hydrodynamic shear along the filter medium is maintained at a high level.

To provide an apparatus for separating particles from a liquid comprising valves on the filtrate outlet and on the bypass outlet, wherein the proportion of the liquid bypassing the filter medium over liquid passing through the medium can be controlled and maintained to an optimal value even as the pressure drop of fluid passing through the filter medium varies as a function of the cake buildup on the medium.

To provide a liquid filtration apparatus designed to avoid pockets of idle or recirculating fluid where particles are likely to be trapped or to accumulate under the action of gravity.

To provide a method for separating particles from a liquid comprising the step of injecting the particle laden liquid into a chamber having an axis of symmetry through long narrow slits extending along most of the axial dimension of the chamber, so as to evenly swirl the injected particle laden liquid about the axis of the chamber to form an even tangent flow along the surface of a filter element whose axis is parallel to the axis of the chamber.

To provide a method for separating particles from a liquid in which the pressures at the outlets of the filtrate flow and the bypass flow can be controlled in order to maintain an optimal proportion of filtrate flow over bypass flow and an optimal hydrodynamic shear on the particle cake generated on the filter medium.

To provide a method for separating particles from a liquid in which the flow of wastewater is periodically interrupted so that the forces that maintain the cake of collected particles against the surface of the filter can be canceled or even reverted, and the cake is allowed to fall off.

To provide a method for separating particles from a liquid also comprising the step of purging and collecting the particles accumulated at the bottom of the chamber through an additional purging outlet after the cake is allowed to fall off.

Still further objects and advantages will become apparent from a consideration of the ensuing description and accompanying drawings.

DESCRIPTION OF THE PREFERRED EMBODIMENTS

Figure 1:
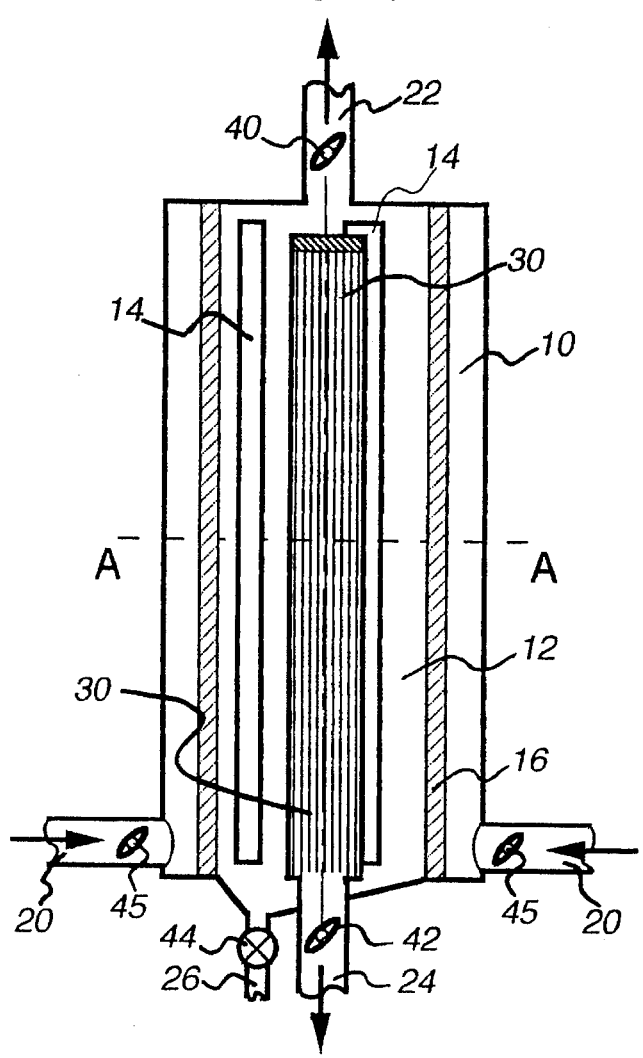
FIG. 1 is a front partial cross-sectional view of an embodiment of an apparatus according to the invention.
Figure 2:
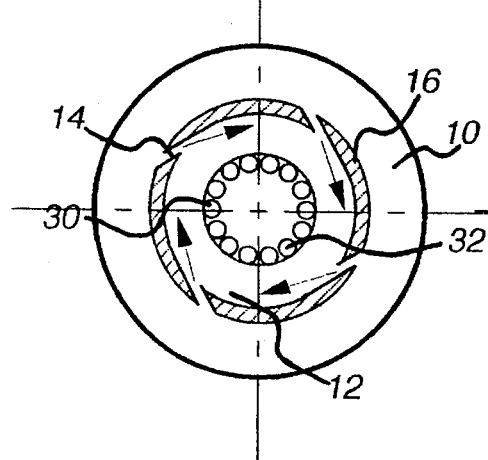
FIG. 2 is a cross-section of the apparatus of FIG. 1 taken along the line A–B shown in FIG. 1.
Figure 3:
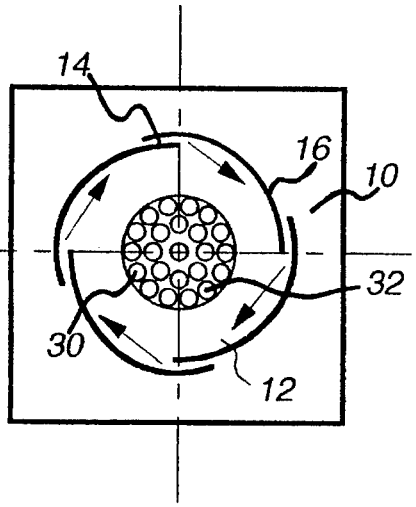
FIG. 3 is an alternative construction for a cross-section of the apparatus of FIG. 1.

Referring now to the drawings of FIG. 1 and FIG. 2, a preferred embodiment 1 of the apparatus comprises two concentric chambers, an outer chamber 10 and a swirl chamber 12. The swirl chamber 12 is generally cylindrical and possesses an axis of approximate symmetry. A filter element 30 is placed centrally along the axis of the swirl chamber. The two chambers communicate with each other through several slits 14. These slits are three dimensional conduits through the lateral wall of the swirl chamber, with a cross-section and a longitudinal dimension. The cross-sections of these conduits are very narrow and very elongated in a direction parallel to the axis of the swirl chamber, and extend along most of the axial dimension of the swirl chamber, as shown in FIG. 1. The longitudinal dimension of these conduits extends in a direction that is almost tangential with respect to the inner contour of a cross-section of the swirl chamber, as shown in FIG. 2 and FIG. 3. This longitudinal dimension is intended to induce a swirling tangential flow within the swirl chamber when allowing liquid to transit from the outer chamber to the swirl chamber. Several shapes are possible to obtain this desired effect. In the embodiment of FIG. 2, the slits 14 are rectangular conduits machined through the wall 16 in directions as tangential as possible with respect to the cylinder of the wall 16, and the wall 16 is thick enough so that the lengths of these conduits are non negligible and so that the fluid has time to acquire momentum in the directions of these conduits. In the embodiment of FIG. 3, similar shapes are obtained for the slits 14 by means of the sectional profiles of the wall. The lateral wall of the swirl chamber is composed of several lapped curved sheets, and the slits are created by the spacings between these lapped curved sheets.

In an alternative embodiment, these lapped curved elements could take the form of lapped curved foils with a wing-like section having a rounded leading edge and a thin trailing edge.

The outer chamber 10 comprises inlet ports 20, and the swirl chamber comprises three outlet ports, a bypass outlet port 22, a filtrate outlet port 24, and a purging outlet port 26. All the ports are generally equipped with valves. The valve 40 on the bypass outlet 22 and the valve 42 on the filtrate outlet 24 are partly or completely open during filtering operations. The valve 44 on the purging outlet 26 is normally closed during filtering operations. The valves 45 on the inlet ports 20 are generally open during filtering operations, but can be used to regulate the flow rate produced by the pump 50 (shown in FIG. 4).

Liquid exiting the swirl chamber 12 through the bypass outlet port 22 can be either collected, or recirculated back to the inlet ports 20 of the outer chamber 10. Liquid exiting the swirl chamber 12 through the filtrate outlet port 24 can only do so by permeating through the filter element 30 located at the center of the swirl chamber. In a preferred embodiment, this filter element 30 is composed of several porous tubes 32 such as the HYDROPERM™ microfiltration tubes manufactured by DYNAFLOW, INC. of Fulton, Md. These tubes are mounted parallel to the axis of the swirl chamber and extend along most of the height of the swirl chamber. The exterior surfaces of these tubes 32 are in contact with the flow of the swirl chamber 12, whereas the interiors of these tubes 32 communicate with the filtrate outlet port 24. The filtrate seeps through the porous walls of the tubes into the tubes before being gathered by the filtrate outlet port 24.

Particle laden liquid enters the outer chamber 10 through the inlet ports 20, is forced into the swirl chamber 12 through the tangential slits 14 of the wall 16 separating the outer and swirl chambers, is set in vortex rotation by these slits. Some of the liquid, now having a higher particle concentration, exits the swirl chamber through the bypass outlet 22, to be either collected or recirculated back to the inlet port of the outer chamber. The rest of the liquid permeates through the walls of the porous tubes 32 of the filter element 30 and is thereby filtered and cleaned before it exits through the filtrate outlet port 24, where it can be collected.

The relative proportions of liquid exiting through the bypass outlet and through the filtrate outlet can be adjusted by the valve 40 mounted on the bypass outlet port 22 and by the valve 42 mounted on the filtrate outlet port 24. Increasing the proportion of recirculated liquid increases the tangential velocity of the flow along the filter element 30 in comparison to the velocity of the flow penetrating the filter element, and allows for adjustments of the cross-flow filtration effect. In the beginning of the filtering operation, the pressure drop across the filter medium is usually low, and increases later on as a cake of particles builds up on the filter medium. To maintain a constant and optimal regime of flow in the system, it may therefore be necessary to obtain a relatively large pressure drop across the valve 24 of the filtrate outlet port 24 by partially closing valve 24 in order to offset the low starting pressure drop across the filter medium, and to open valve 24 more and more as the pressure drop across the filter medium builds up along with the particle cake.

Figure 4:
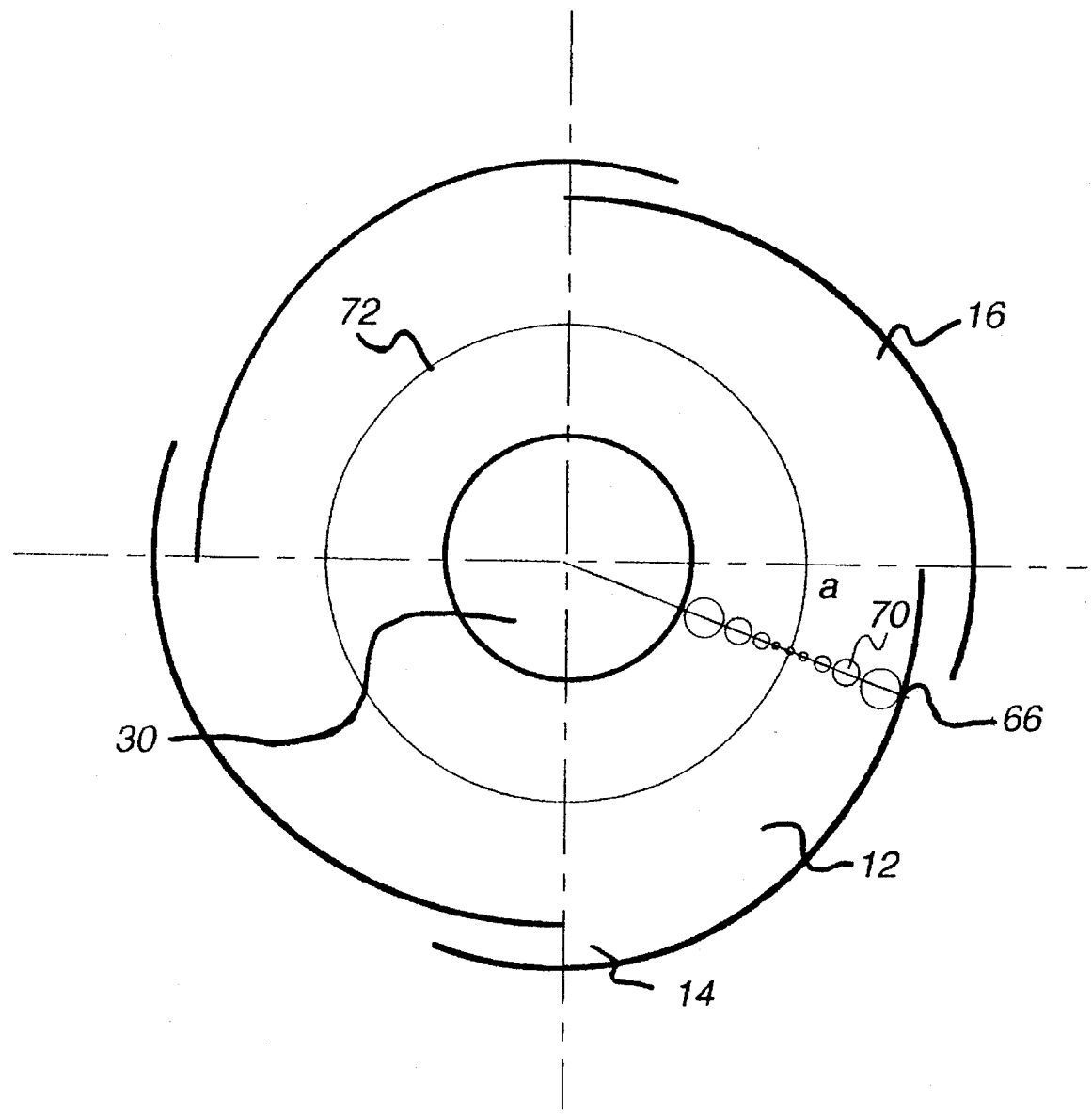
FIG. 4 shows the pressure distribution and the particle distribution in the flow field within a cross-section of the swirl chamber of the apparatus.

With reference to FIG. 4, a cross-section of the swirl chamber 12 is depicted. The flow field in this cross-section is composed of two regions:

an outer region extending from the chamber wall to a cylindrical boundary 72 of radius $\alpha$, in which centrifugal forces are preponderant with respect to viscous forces. In this region, the particles are pushed away from the filter medium, therefore minimizing the particle concentration near the filter medium and preventing filter clogging.

an inner region from the cylindrical boundary 72 of radius $\alpha$ to the filter medium surface acting as a boundary layer for the core filter medium in which viscous forces and shear play a more important role. Because of the pressure gradient distribution in this region, larger particles are subjected to larger centripetal forces than smaller particles. Consequently, larger particles tend to reach the surface of the filter medium first, resulting in a well-segregated stratification of particles in the cake at the surface of the medium, with larger particles closer to the medium. This segregation mode is known to provide the best filtration performance at the lowest pressure drop. An additional advantage of this segregation mode is that the presence of larger particles at the interface between the filter medium and the cake produces reduced contact forces for the cake, so that the cake can readily fall off when the liquid flow is interrupted. Finally, the shear in this inner region of the flow keeps this cake thin, also contributing to keeping the pressure drop across the cake at a low and constant level.

Figure 5:
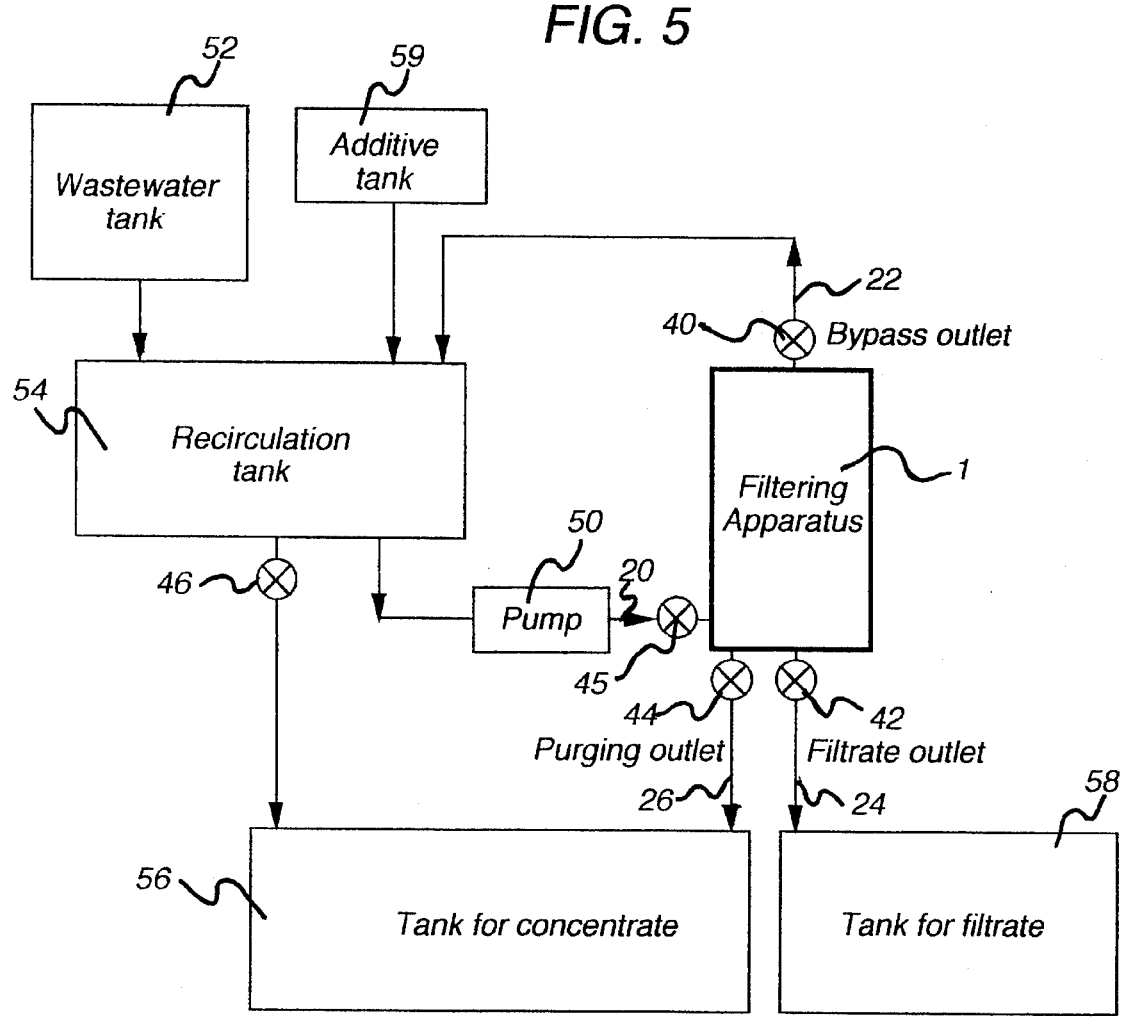
FIG. 5 is a schematic diagram showing how an apparatus according to the invention can be connected to the tanks receiving the wastewater, the concentrate and the filtrate.

The distribution of particles resulting from this very particular flow field is illustrated along the radial line 66 of FIG. 5. The black disks 70 along line 66 symbolize the particles at greatly exaggerated dimensions. For radii larger than $\alpha$, the particles in the flow are segregated with increasing sizes for larger radii. For radii smaller than a, the particles in the flow tend to stratify with increasing sizes for smaller radii.

With reference to FIG. 1 again, the flow of wastewater into the inlet ports 22 can be interrupted periodically; as a consequence, the pressure forces that maintain the cake of collected particles against the surface of the tubes 32 of filter 30 disappear, and these particles are allowed to fall off. As explained above, this process is facilitated by weak contact forces between the cake and the surface of the filter medium thanks to the stratification of the particles generated by a flow field that tends to place large particles at the interface between the cake and the filter mediums. A collection chamber 18 and a purging outlet 26 are provided at the bottom of the swirl chamber 12. The valve 44, which remains closed during the filtering operation, can be opened while the flow of wastewater is interrupted, in order to purge out the concentrated wastewater containing the particles originating from the cake that accumulates by gravity at the bottom of the chamber.

In FIG. 5, a schematic diagram shows one of the possible arrangements by which an apparatus 1 according to the invention can be connected to the tanks receiving the wastewater, the concentrate and the filtrate. Wastewater is discharged into the wastewater tank 52, then transferred into the recirculation tank 54. A pump 50 takes the liquid from the recirculation tank 54 and feeds the filtering apparatus 1 through the inlet port 20; a valve 45 on this inlet port can be used to regulate the output of the pump. Instead of a single filtering device 1, several filtering devices identical to the apparatus 1 can be mounted in parallel or in series. The filtrate continuously flowing from the filtrate outlet 24 through valve 42 is collected in a filtrate tank 58. The liquid flowing out of the apparatus 1 through the bypass outlet 22 is sent back to the recirculation tank 54. Less liquid is sent back to the recirculation tank than is pumped by the pump 50, the difference being equal to the filtrate sent to the tank for filtrate 58. The valve 46 can be set so that the flow of wastewater from the wastewater tank to the recirculation tank compensates the production of filtrate. After the liquid in the recirculation tank has reached a target concentration, the pump is stopped and the concentrate is transferred to the tank for concentrate 56. Stopping the pump allows the cake of particles accumulated on the filter medium to fall to the bottom of the filtering apparatus, which can be purged into the tank for concentrate 56 by opening the valve 44 controlling the purging outlet 26. An additive tank 59 is used to inject additive liquids and suspensions into the main circuit either in a pre-treatment phase prior to the wastewater treatment or during the wastewater treatment. For example, it is well known with cross-flow filtration systems that a pre-treatment step consisting of depositing a layer of porous granular material on the surface of the porous filter element prior to operation with wastewater significantly improves the subsequent filtration performance. Typically, the porous granular material is diatomaceous earth (DE), a very fine fossil sand of porous silica cell walls of various microscopic one-celled algae of the class Bacillariophyceae. The layer formation is obtained by mixing the DE with water in the additive tank 59 and running the filtration system with this tank instead of the wastewater tank. The deposited DE layer is very efficient in the sense that it can retain very small particles of wastewater with minimal pressure drop. The pre-treatment step is performed with relatively slow flow rates to minimize DE cake stratification, and to insure enough DE cake cohesion so that, when the flow is periodically interrupted during the subsequent wastewater treatment, the underlying DE cake remains in place while the stratified wastewater cake falls off.

The additive tanks 59 can also be used for injecting useful particles or chemicals during the wastewater filtration process. For instance, it has been observed that injecting a suspension of lime particles during the wastewater treatment significantly improves the output of filtrate water.

The teachings of the present invention meet the need for efficient and economical particle removal from the effluent and process streams of industrial, government and commercial plants. They have applications for cleaning operations such as laundry or car wash operations. They also have applications in advanced process of materials production, manufacturing, and biotechnology, where concentration of particles such as catalysts, precious metals or reaction products is important. Examples include concentration of suspended solids including toxic heavy metals in areas such as water jet stripping of paint, scale and coating; battery manufacturing; metal finishing, plating, smelting and refining; and other industries with similar wastewaters. The very high flow rates of filtrated effluent make the present invention particular competitive and attractive for high volume applications.

Of course, various changes, modifications and alterations of the teachings of the present invention may be contemplated by those skilled in the art without departing from the intended spirit and scope of the present invention. As such, it is intended that the present invention only be limited by the terms of the appended claims.

I claim:

1. A method for separating particles from a liquid in a device with a longitudinal central axis including an outer fluid containment member with static members within, the outer fluid containment member encompassing an inner swirl chamber with a lateral wall that is substantially cylindrical in shape, at least one elongated porous filter element symmetrically positioned with respect to the central axis, multiple elongated narrow injection slits through the lateral wall, the slits are openings that are substantially coextensive with the at least one elongated porous filter element; the method comprising the steps of:

(a) swirling the liquid about the longitudinal central axis by injecting the liquid through the elongated narrow injection slits, thereby generating a vortex with similar flow characteristics at various cross-sections of the central axis;

(b) collecting filtered liquid at a first outlet from the device which permeates across the at least one filter element; and (c) collecting a mixture of particles and liquid which does not permeate across the at least one filter element at a second outlet from the device.

2. The method of claim 1, further comprising an additional step of periodically interrupting the flow of liquid, whereby particles collected at surfaces of the at least one filter element are allowed to fall off.

3. The method of claim 2, further comprising an additional step of collecting a mixture of particles and liquid from the device's bottom after interrupting the flow of liquid.

4. The method of claim 1, further comprising a preliminary step of injecting a mixture of diatomaceous earth and water in the swirl chamber, thereby generating at surfaces of the at least one porous filter element a layer of diatomaceous earth.

5. The method of claim 1, further comprising an additional step of regulating pressures of the first and second outlets from the device thereby optimally maintaining: i) desired flow of filtered liquid and ii) hydrodynamic shear of a surface particle layer generated on surfaces of the at least one porous filter element.

6. A method for separating particles from waste waters in a device with a longitudinal central axis including an outer fluid containment member the outer fluid containment member encompassing an inner swirl chamber with a lateral wall substantially cylindrical in shape, at least one elongated porous filter element symmetrically positioned with respect to the central axis, multiple narrow elongated slits through the lateral wall, the narrow elongated slits are openings that are substantially coextensive with the at least one elongated porous filter element; the method comprising the steps of:

(a) injecting a mixture of diatomaceous earth and water in the swirl chamber through the narrow elongated slits, thereby generating at the surface of the at least one filter element a layer of diatomaceous earth;

(b) swirling the waste waters about the central axis of the swirl chamber by injecting it through the slits;

(c) collecting filtered liquid which permeates across the at least one filter element;

(d) collecting a mixture of particles and liquid which does not permeate across the at least one filter element as it flows out of the device;

(e) periodically interrupting the waste water's flow; and (f) collecting an accumulated mixture of particles and liquid at the device's bottom portion after interrupting the waste water's flow.

7. An apparatus for separating particles from a liquid comprising:

an outer fluid containment member having a longitudinal central axis with an inlet port means for ingress of the particles and liquid to the apparatus, the outer fluid containment member encompassing an inner substantially cylindrical swirl chamber with a lateral wall;

at least one elongated porous filter element symmetrically positioned with respect to the central axis;

multiple narrow elongated injection slits through the lateral wall, the narrow elongated slits are openings that are substantially coextensive with the at least one elongated porous filter element, thereby i) imparting to a liquid flow being forced through the slits into the swirl chamber a swirling motion and ii) generating a vortex to the liquid a similar flow characteristics at various cross-sections of the swirl chamber;

at least one outlet port means for collecting permeate liquid permeating through the at least one porous filter element; and at least one bypass outlet port means for collecting and reintroducing a mixture of particles and liquid defined as the bypass liquid which does not permeate across the at least one filter element.

8. The apparatus of claim 7, wherein the injection slits are elongated rectangular voids through the swirl chamber's lateral wall, the axes of the voids being between about zero with respect to tangential directions of cross-sections of the swirl chamber.

9. The apparatus of claim 7, wherein the swirl chamber's lateral wall is a plurality of spaced lapped arcuate segments, thereby forming the injection slits which are spacings between the lapped arcuate segments.

10. The apparatus of claim 9, wherein the plurality of spaced lapped arcuate segments are in the form of lapped curved foils with a winged cross-section having a rounded leading edge along with a thin trailing edge.

11. The apparatus of claim 7 further comprising a valve attached to the at least one bypass outlet port means thereby controlling flow rate of the bypass liquid.

12. The apparatus of claim 7, further comprising a means for purging a high concentration mixture of liquid and particles from the swirl chamber's bottom, thereby extracting undesirable material when interruption of liquid flow occurs.

* * * * *